(12) United States Patent
Richardson et al.

(10) Patent No.: US 11,758,381 B2
(45) Date of Patent: *Sep. 12, 2023

(54) PRE-ALERT SYSTEM FOR FIRST RESPONDERS

(71) Applicant: EaseAlert, LLC, Gainesville, FL (US)

(72) Inventors: Blake Richardson, Gainesville, FL (US); Elezar Tonev, Gainesville, FL (US); Michael Edward Jordan, Terra Ceia, FL (US)

(73) Assignee: EaseAlert, LLC, Gainesville, FL (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/443,850

(22) Filed: Jul. 28, 2021

(65) Prior Publication Data

US 2021/0360378 A1 Nov. 18, 2021

Related U.S. Application Data

(63) Continuation of application No. 16/874,310, filed on May 14, 2020, now Pat. No. 11,109,213.

(Continued)

(51) Int. Cl.
*H04W 4/90* (2018.01)
*H04W 76/50* (2018.01)
(Continued)

(52) U.S. Cl.
CPC ............. *H04W 4/90* (2018.02); *H04W 4/022* (2013.01); *H04W 76/50* (2018.02); *H04L 2101/622* (2022.05)

(58) Field of Classification Search
CPC ....... H04W 4/90; H04W 4/022; H04W 4/029; H04W 4/02; H04W 76/50; H04L 61/6022
See application file for complete search history.

(56) References Cited

U.S. PATENT DOCUMENTS 6,292,687 B1 * 9/2001 Lowell ................... A61B 5/002
600/515
7,113,090 B1 * 9/2006 Saylor .................. G08B 25/005
340/539.18

(Continued)

OTHER PUBLICATIONS

"U.S. Appl. No. 16/874,310, Advisory Action dated Mar. 22, 2021", 3 pgs.

(Continued)

*Primary Examiner* — Jean A Gelin
(74) *Attorney, Agent, or Firm* — Schwegman Lundberg & Woessner, P.A.

(57) ABSTRACT

A method includes receiving data identifying a responder in response to a call to an emergency operator, identifying one or more persons associated with the responder, determining communication addresses of communication devices associated with respective persons of the one or more persons, and sending a communication to each of the communication devices using the communication addresses to issue a pre-alert to the one or more persons that allows the one or more persons to prepare for a call to action. A system using natural language processing may be used to analyze a call in progress and aid in dispatching. The system may also identify the responder and assist in initiating the pre-alert prior to an alarm being sounded.

20 Claims, 9 Drawing Sheets

Related U.S. Application Data

(60) Provisional application No. 62/849,394, filed on May 17, 2019.

(51) Int. Cl.
*H04W 4/021* (2018.01)
*H04L 101/622* (2022.01)

(56) References Cited

U.S. PATENT DOCUMENTS

| | | |
|---|---|---|
| 2004/0172222 A1 | 9/2004 | Simpson et al. |
| 2009/0270065 A1 | 10/2009 | Hamada et al. |
| 2009/0326595 A1* | 12/2009 | Brockway ............ A61B 5/0205 607/3 |
| 2011/0117878 A1 | 5/2011 | Barash et al. |
| 2011/0227756 A1 | 9/2011 | Otero et al. |
| 2012/0087482 A1 | 4/2012 | Alexander, Sr. |
| 2012/0150755 A1* | 6/2012 | Kumar ................ G08B 21/12 705/317 |
| 2012/0209520 A1 | 8/2012 | Ingvalson et al. |
| 2012/0256762 A1 | 10/2012 | Greenberger |
| 2013/0030915 A1 | 1/2013 | Statler et al. |
| 2013/0097249 A1 | 4/2013 | Cavalcante et al. |
| 2014/0218515 A1* | 8/2014 | Armendariz ........... G08B 23/00 340/517 |
| 2014/0368601 A1 | 12/2014 | Decharms |
| 2015/0097678 A1* | 4/2015 | Sloo .................. G01V 8/10 340/602 |
| 2015/0362927 A1 | 12/2015 | Giorgi |
| 2016/0012701 A1* | 1/2016 | Lu .................. G08B 25/016 222/183 |
| 2016/0044459 A1 | 2/2016 | Muchina |
| 2016/0196733 A1* | 7/2016 | Brasch ................ G08B 25/002 340/573.4 |
| 2016/0335879 A1 | 11/2016 | Carr |
| 2016/0358466 A1* | 12/2016 | Youngblood .......... G08B 27/00 |
| 2017/0140630 A1* | 5/2017 | Brasch ................ G08B 25/002 |
| 2017/0161678 A1* | 6/2017 | Scholey ............. G06Q 30/0633 |
| 2017/0180955 A1 | 6/2017 | Bohlander et al. |
| 2017/0238157 A1 | 8/2017 | Best et al. |
| 2017/0251347 A1 | 8/2017 | Mehta et al. |
| 2017/0278378 A1 | 9/2017 | Kaplita et al. |
| 2017/0316675 A1 | 11/2017 | Bauer |
| 2017/0325056 A1 | 11/2017 | Mehta et al. |
| 2018/0151046 A1 | 5/2018 | Park et al. |
| 2019/0012904 A1* | 1/2019 | Yusuf ..................... G06N 3/048 |
| 2019/0066464 A1* | 2/2019 | Wedig ................ G08B 27/001 |
| 2019/0313230 A1 | 4/2019 | Macgabann |
| 2019/0156646 A1 | 5/2019 | Richey et al. |
| 2019/0174208 A1 | 6/2019 | Speicher et al. |
| 2019/0297399 A1 | 9/2019 | Sieja et al. |
| 2019/0371054 A1 | 12/2019 | Young et al. |
| 2020/0175842 A1 | 6/2020 | Merjanian et al. |
| 2020/0274962 A1 | 8/2020 | Martin et al. |
| 2020/0288295 A1 | 9/2020 | Martin et al. |
| 2020/0367040 A1 | 11/2020 | Richardson et al. |
| 2021/0289334 A1* | 9/2021 | Martin .................... H04W 4/38 |

OTHER PUBLICATIONS

"U.S. Appl. No. 16/874,310, Appeal Brief filed Jun. 1, 2021", 18 pgs.
"U.S. Appl. No. 16/874,310, Decision on Pre-Appeal Brief Request for Review dated Apr. 20, 2021", 2 pgs.
"U.S. Appl. No. 16/874,310, Examiner Interview Summary dated Nov. 6, 2020".
"U.S. Appl. No. 16/874,310, Final Office Action dated Dec. 30, 2020", 13 pgs.
"U.S. Appl. No. 16/874,310, Non Final Office Action dated Sep. 24, 2020".
"U.S. Appl. No. 16/874,310, Notice of Allowance dated Jul. 14, 2021", 15 pgs.
"U.S. Appl. No. 16/874,310, Pre-Appeal Brief Request for Review filed Mar. 30, 2021", 4 pgs.
"U.S. Appl. No. 16/874,310, Response filed Mar. 1, 2021 to Final Office Action dated Dec. 30, 2020", 7 pgs.
"U.S. Appl. No. 16/874,310, Response filed Nov. 5, 2020 to Non Final Office Action dated Sep. 24, 2020", 8 pgs.

\* cited by examiner

PRE-ALERT SYSTEM FOR FIRST RESPONDERS

RELATED APPLICATIONS

This application is a continuation of U.S. patent application Ser. No. 16/874,310, filed May 14, 2020, which claims the benefit of priority to U.S. Provisional Application Ser. No. 62/849,394, filed May 17, 2019, each of which are incorporated herein by reference in their entireties.

BACKGROUND

Cardiovascular disease is a leading cause of line of duty death for firefighters. It is caused in large part by stress and overexertion. These emergency responders are exposed to high levels of stress due to the nature of their job. Stress is heightened by the startle response resulting from loud alarms that sound off when a call-to-action comes into the station.

SUMMARY

A method includes receiving data identifying a responder in response to a call to an emergency operator, identifying a relay device associated with the identified responder, and sending a communication to the relay device to cause the relay device to issue a pre-alert to a communication device of at least one person associated with the responder prior to the official dispatch or audible tones/alarm that traditionally alerted the responder.

In a further embodiment, a system using natural language processing may be used to analyze an emergency call, such as a 9-1-1 call in progress and aid in dispatching. The system may also identify the responder and assist in helping the operator determine which units and personnel to dispatch in response to the emergency sooner.

DETAILED DESCRIPTION

Figure 1:
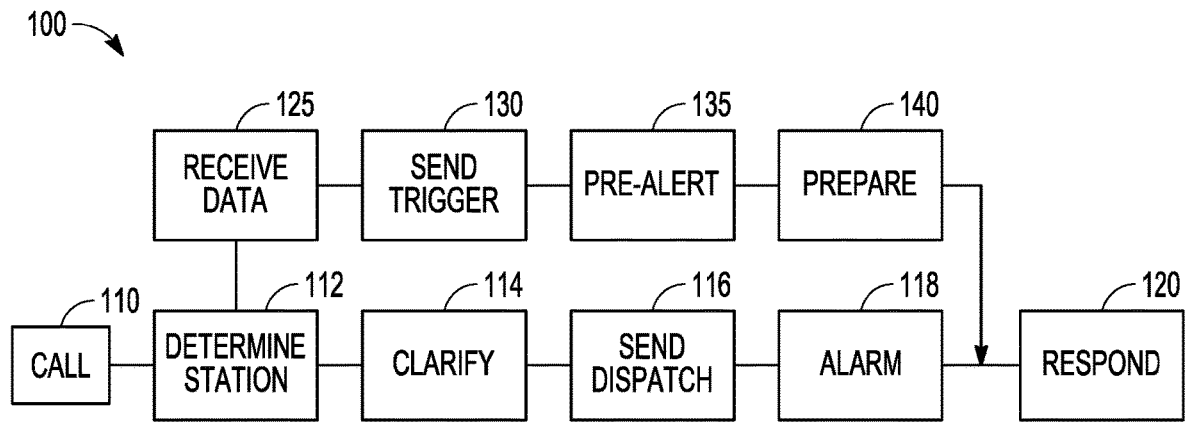
FIG. 1 is block flow diagram of a system for providing a gentle pre-alert to a person prior to a responder alarm being sounded according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Cardiovascular disease is a leading cause of death for firefighters. It is caused in large part by stress and overexertion. Stress and overexertion are heightened by loud alarms that sound off when a call-to-action comes into the station. Other emergency responders are called to action with startling, audible tones. They are also exposed to high levels of stress and overexertion.

A gentle, tactile pre-alert (e.g. vibration) provided via a personally wearable user device that is felt before the alarms sound off would afford these individuals a period of preparation before being startled by the alarm. This preparation period allows the user to maintain moderate heart rate, blood pressure, and other health measures. This reduces overall stress and improves overall health. Improved health could mitigate the risk of cardiovascular disease for firefighters and other emergency personnel. In addition, civilians often wake up to an audible alarm. They can also benefit from a subtle vibration pre-alert to precede the audible alarm since a vibrotactile alert offers a more positive wake-up experience. Further example uses include responders that are away from the station, or a responder's house if he/she is a volunteer firefighter that works from home, or a radio that is carried by the responder wherever he/she is (volunteer or career firefighter). Still further example uses include a use by a hospital for medical personnel and students who would benefit from a tactile pre-alert before a school bell rings. By tapping into existing communication systems (e.g. Computer Aided Dispatch (CAD), cell phone towers, etc.), user devices can receive alerts and notify users with a gentle vibration.

The wearable user device may be in the form of wristbands that may be alerted by radio frequency (RF), Bluetooth Low Energy (BLE), Wi-Fi, or other. In further embodiments, a more scalable and reliable communication method (e.g. Internet Protocol communication network (IP), cellular, Wi-Fi, etc.) may be used. In another embodiment, a pre-alert light is triggered to turn on when the pre-alert notification is sent. The light may be in any form and placed in a position that ensures the light is visible to a sleeping responder. A system is programmed to send the pre-alert once a particular step in an emergency call such as a 9-1-1 call process has happened (i.e. after the fire station is confirmed but before exact personnel at station are dispatched) and/or triggered manually by the operator/dispatcher/employee/person (hereafter referred to as, "Operator") at dispatch center.

FIG. 1 is block flow diagram of a system 100 for providing a gentle pre-alert to a person prior to a responder alarm being sounded. A call 110 may be received by an operator at a call center. The call center may implement a Computer Aided Dispatch (CAD) system to facilitate call processing. The operator will listen to the call 110 and with the help of a call processing system or even based on personal knowledge, determine a responder, such as a fire station at 112. Once the responder is determined, data identifying the responder may be sent to a server that receives data as indicated at 125. The operator may continue with the call and request clarifying information as indicated at 114. Following receipt of clarifying information, the operator may send a dispatch call at 116 to the responder resulting in an alarm sounding at 118. The alarm jolts persons associated with the responder to quickly prepare and board transportation to an event prompting the original call, such as a fire.

Once the server receives the data at 125, a communication, such as a trigger at 130 is provided. The trigger 130 may sent by a relay device, such as a Raspberry Pi that triggers an RF signal, located proximate to or within a responder location, such as a fire station. The relay device generates a communication to one or more devices being worn by the persons associated with the responder to gently alert such persons in a tactile manner prior to the alarm being sounded at 118. This alert, also referred to as a pre-alert allows the persons to start preparing at 140 to respond even prior to the alarm, or at least to prepare emotionally, even subconsciously, to expect the alarm before it sounds.

Figure 2:
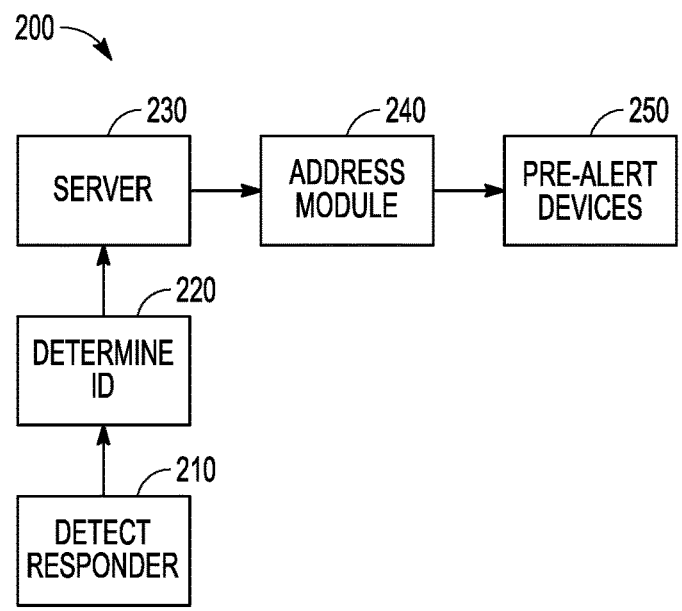
FIG. 2 is a block flow diagram illustrating a system for providing pre-alerts to persons associated with a first responder prior to an alarm being sounded according to an example embodiment.

FIG. 2 is a block flow diagram illustrating a system 200 for providing pre-alerts to persons associated with a first responder prior to an alarm being sounded. At a detection device 210, a responder is detected. The responder may be detected in response to an emergency call to a call center in one embodiment. An operator, such as a person or machine learning software uses information associated with the call, such as caller ID, location of the caller, words spoken by the caller, and other information, to identify that an emergency situation exists, and to determine the appropriate responder to be dispatched to handle the emergency.

Once the responder is identified by the operator, an identifier (ID) of the appropriate responder is determined at 220. The ID may be determined based on a lookup table, or personal knowledge of the operator when the operator is a person. The responder may be identified as a name, or an ID, such as a globally unique ID.

The ID is provided to a server 230. Server 230 uses the ID to identify communication devices of persons associated with the identified responder that would be involved in responding to the emergency. The devices may be identified in various ways. In some embodiments, a MAC address of each device is determined. The MAC address may be provided to an address module 240, which generates a signal that includes the MAC address to be received by pre-alert devices 250 to provide a gentle pre-alert to each person In further embodiments, a cellular number may be used to send the signal as a message, or an IP or email address of the person associated with the device may be used. The pre-alert devices 250 may be configured to provide the gentle pre-alert in response to such communications generated by the server 230, either based on the origin of the communications, or a pre-alert code embedded in the communication that the pre-alert device is programed to recognize as a trigger to provide the gentle pre-alert. The pre-alert device may be a smart watch in one embodiment with either cellular capability or wirelessly connected to a cellular phone. The pre-alert device may be a small unit in another embodiment designed to fit into a pocket or to be worn in some other way that is not impeding to the user.

Figure 3:
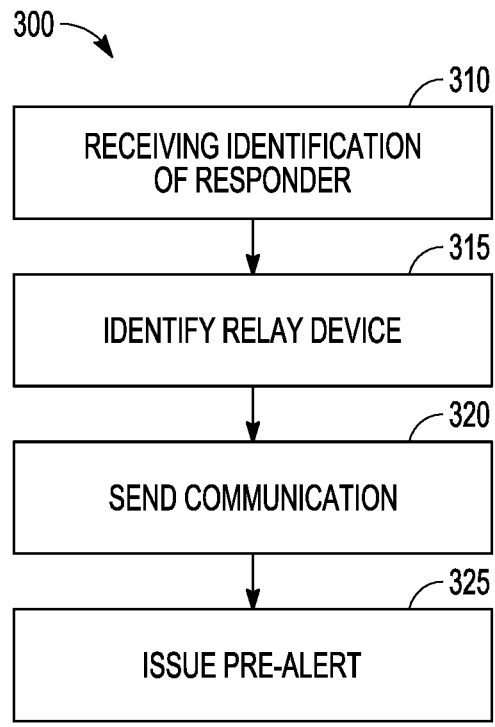
FIG. 3 is a flowchart illustrating a method of issuing a pre-alert based on an emergency call being processed according to an example embodiment.

FIG. 3 is a flowchart illustrating a method 300 of issuing a pre-alert based on an emergency call being processed. At operation 310, data identifying a responder in response to a call to an emergency operator is received. A relay device associated with the identified responder is identified at operation 315. In one embodiment this relay device may be a physical module placed near the communication device or devices. In another embodiment, the relay device may be cloud-based without a physical component. A communication is sent at operation 320 to the relay device to cause the relay device to issue a pre-alert at operation 325 to a communication device of at least one person associated with the responder. The communication is sent to the relay device in response to an operator action, triggered by a person or by a machine, and prior to an alarm being sounded at the responder.

The data identifying a responder may be a physical address of a structure and wherein the structure is within an area for which the responder is responsible. The structure may be determined by the operator to be associated with a fire. The responder in the event a fire is determined is a fire station.

The relay device may be identified using the identified responder to determine a logical address of the relay device. The logical address of the relay device may be a communication address such as a MAC address. The communication is sent to the relay device based on the IP and MAC addresses in one embodiment.

The pre-alert may be a wireless signal to the communication device worn by at least one person associated with the responder. The communication device vibrates in response to the wireless signal from the relay device. The communication device is adapted to be worn on a wrist of the at least one person in one embodiment. The relay device sends a wireless signal to each of the communication devices worn by respective persons associated with the responder.

Figure 4:
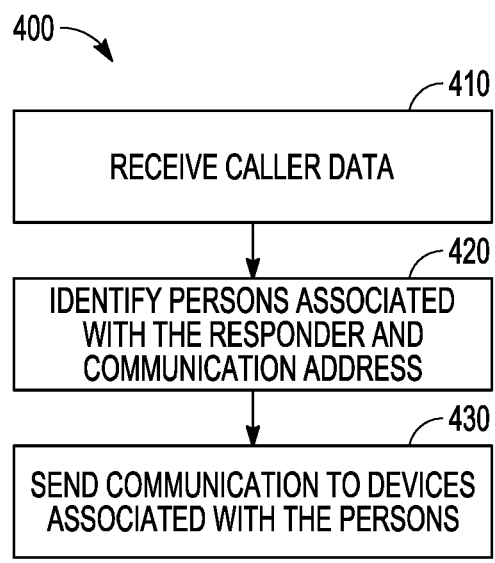
FIG. 4 is a flowchart of an alternative method of providing a pre-alert to persons associated with a responder according to an example embodiment.

FIG. 4 is a flowchart of an alternative method 400 of providing a pre-alert to persons associated with a responder. Method 400 begins by a server receiving caller data at operation 410 in response to a call to an emergency operator. The caller relays data that the operator transcribes to determine which responder to dispatch. Predictive software may be used to transcribe the caller's data in the same way, assisting the operator/dispatcher. The caller's data may be used to identify a responder identifier (ID) such as a physical or logical address in various embodiments. The ID is used at operation 420 to identify persons associated with the responder and their corresponding communication addresses. As indicated previously, the communication addresses can be a MAC address of each communication device, or cellular or email addresses of the persons. At operation 430, a communication is sent to each of the communication devices using the communication addresses to issue a pre-alert to the one or more persons.

In one embodiment the pre-alert is provided to firefighters, paramedics, and other first responders. Traditionally, the operator at the emergency call center would receive a 9-1-1 call and send an initial alert to nearby responders, simply notifying the responders that there is an emergency nearby and they may be dispatched. This initial alert was sent to several nearby responders because it would take several minutes for the operator obtain information from the caller sufficient to look up the proper action to take and appropriate responder(s) to page. The initial alert was used to prepare responders in the area for a call to action before all of the information was available. Advances in technology made the operator's job much more efficient, decreasing the time it takes for the operator to obtain the sufficient information to page the appropriate responders. The initial signal remains in the system, but it is not utilized to prepare responders. Instead, it comes in the form of an email to only high-ranking personnel, a fax machine, a computer notification, or some other form of notification that is not always apparent to the responder.

In embodiments of the present inventive subject matter, the pre-alert taps into the initial signal and uses it to prepare each responder with a vibration that precedes the alarm. Efficiency is gained because the responders know that the pre-alert is means that they are the responders who will receive the alarm. The pre-alert enables the responders to begin preparing to respond prior to the alarm sounding.

The system and methods described herein enhance the alerting of first responder personnel and does not replace existing alarm systems. Stress-reduction is provided for medical personnel and other users by gently alerting them prior to receiving a potentially jarring alarm, thereby reducing negative health effects related to abrupt alarm sounds and calls to action. Hard of hearing firefighters can benefit from physical pre-alert and can help those working with loud equipment to not have to worry about missing an alarm. Firefighters engaged in physical training do not need to have a radio on them since they will have the pre-alert with the communication device, which may be in the form of a smart band with a wirelessly triggered vibration mechanism. More freedom is facilitated during physical fitness, allowing on-duty personnel to workout, play sports, or do whatever they want with more ease given the unobtrusive nature of a smart band.

The smart band also alleviates public privacy and HIPAA concerns as a simple vibration is used to alert personnel without the need for a radio announcing a call to all those nearby to hear. The smart band may also be waterproof allowing water training and showering without missing a pre-alert.

The pre-alert may also provide health benefits for the responder by improving sleep leading to less stress, reduction in sick leave, improved cognitive function, improved decision-making during response, less risk of cancer, suicide, and cardiovascular disease. The pre-alert may also improve reliability of alerts and lead to improved dispatch, as responders will be in a better state of mind without additional alarm-induced adrenaline.

The responder may be able to carry out duties more effectively and efficiently since the pre-alert allows them to begin preparing for the alarm and dispatch information before the traditional alerting system would allow them to begin preparing.

The pre-alert may be a physical alert in the form of vibration and/or light and/or sound. The vibration will last for at least 0.001 seconds in one embodiment, and in some communication devices, may repeat until dismissed. A graduating vibration may be used in some embodiments such that the vibration begins at a low level and gradually increases in intensity to a higher level designed to garner the attention of the wearer that may be sleeping or pre-occupied. Different colors may be used to signify the nature of the emergency or other event. The vibration will occur at least 0.0001 seconds before the alarm sounds. If the pre-alert includes light, the light will flash, gently oscillate, or light up in some other way to notify user of call. Communications may utilize either radio, cellular, internet protocol (IP), Wi-Fi, dual sim card, and/or other communication method to relay message from dispatch to wristbands.

In some embodiments, various personnel may utilize the smart wristband, smart watches with or without a wireless connection to a cellular phone. Thus, pre-alerts may be sent via multiple different wireless channels from email and text to the use of a relay device sending a communication based on the MAC address for multiple persons associated with a single responder.

In addition to a vibration motor, heart-rate monitors, global positioning system (GPS), lights, and tools to measure and store other fitness- and health-related data may be used in the communication devices and servers. Fitness and health related data may be stored on a database at the server level to which authorized personnel have access.

An app may be used to convert any smartwatch with communication capabilities and a vibration motor into a communication device to provide the pre-alert.

Civilians, firefighters, police officers, military personnel, hospital workers, students, and more can all benefit from the gentle physical pre-alert system.

In one embodiment, the pre-alert system is an app and/or a smart wristband that integrates with the Computer Aided Dispatch (CAD) system at each fire department. When a call comes into the station, the smart band vibrates for at least 0.001 seconds before the alarm sounds to notify the firefighter that there is an emergency. The purpose of this gentle pre-alert is to reduce stress and ensure that the firefighter's risk of suffering from stress related harm is mitigated. The harsh alarms utilized by most fire departments increase the chance of suffering from cardiovascular disease because it is a startling alarm that forces firefighters to immediately go from resting heart rates to tachycardic or overstressed heart rates in a matter of seconds.

Figure 5:
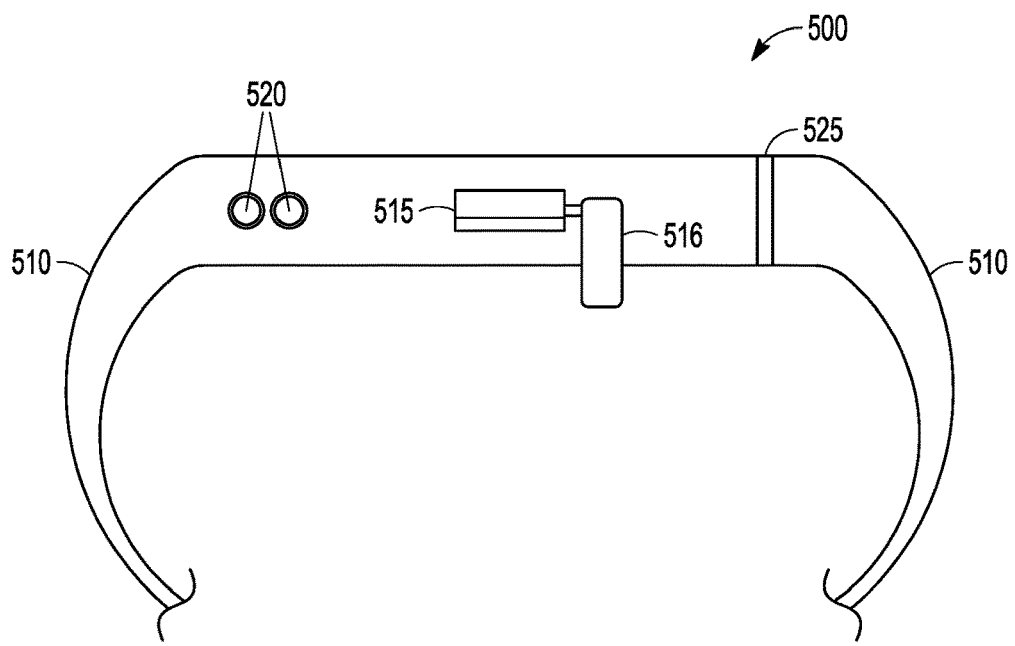
FIG. 5 is a side view of a smart wristband for use in delivering a pre-alert to a person associated with a responder prior to an alarm being sounded according to an example embodiment.

FIG. 5 is a side view of a smart wristband 500 for use in delivering a pre-alert to a person associated with a responder prior to an alarm being sounded. The wristband incudes a band 510 that is sized to fit a wrist of a person. An electronics module may be enclosed within the band 510 and is shown in detail in further figures. The band 510 may be elastic and include a clasp to securely fit on the wrist. Silicone may be used to form the band 510. A USB charging port 515 may be provided along a side of the band 510 for charging a battery enclosed within the band 510. A removable waterproof flap 516 may cover the port 515 when not in use for charging the battery and/or interfacing with a computer for updates or information transfer. Multiple buttons 520 may be provided to interface with the electronics module. One or more LED lights 525 may be supported by the band 510 in a position to be easily seen by a wearer, such as on the sides and top portion of the band normally positioned on a top of a wrist of a wearer. The lights 525 may be used to emit different colors signifying corresponding different natures of an emergency.

Figure 6A:
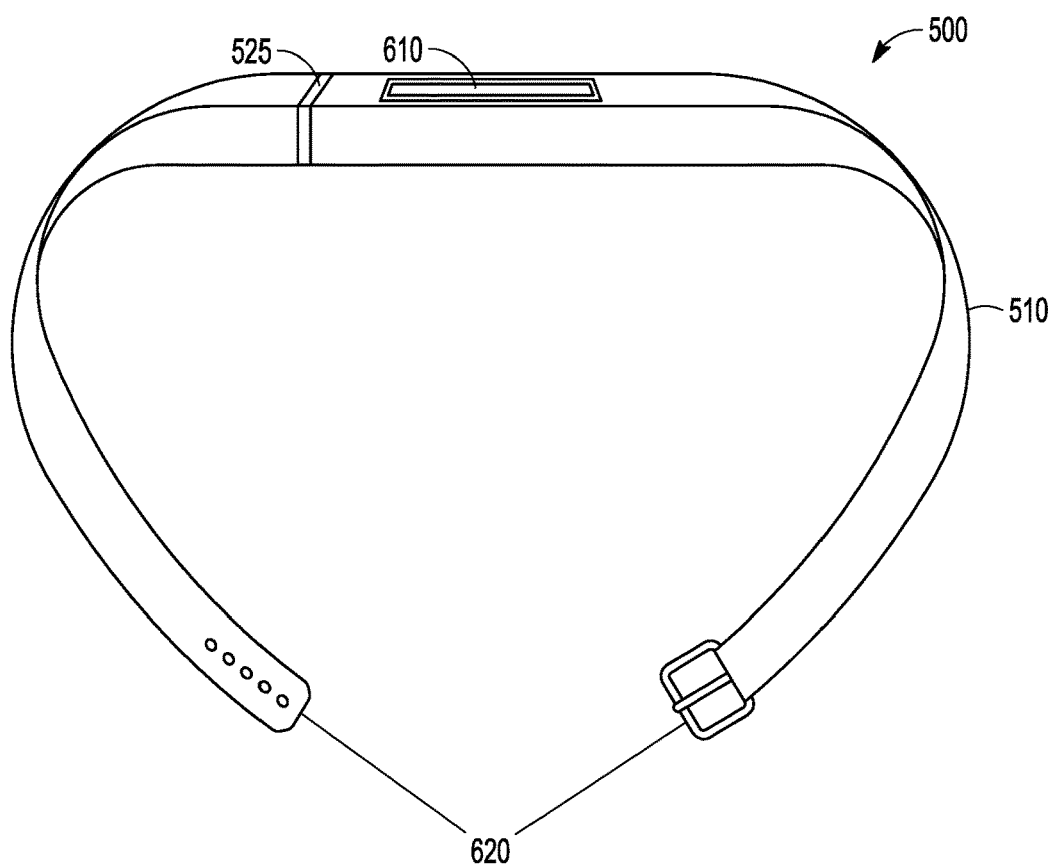
FIG. 6A is a perspective view of the smart wristband of FIG. 5 according to an example embodiment.
Figure 6B:
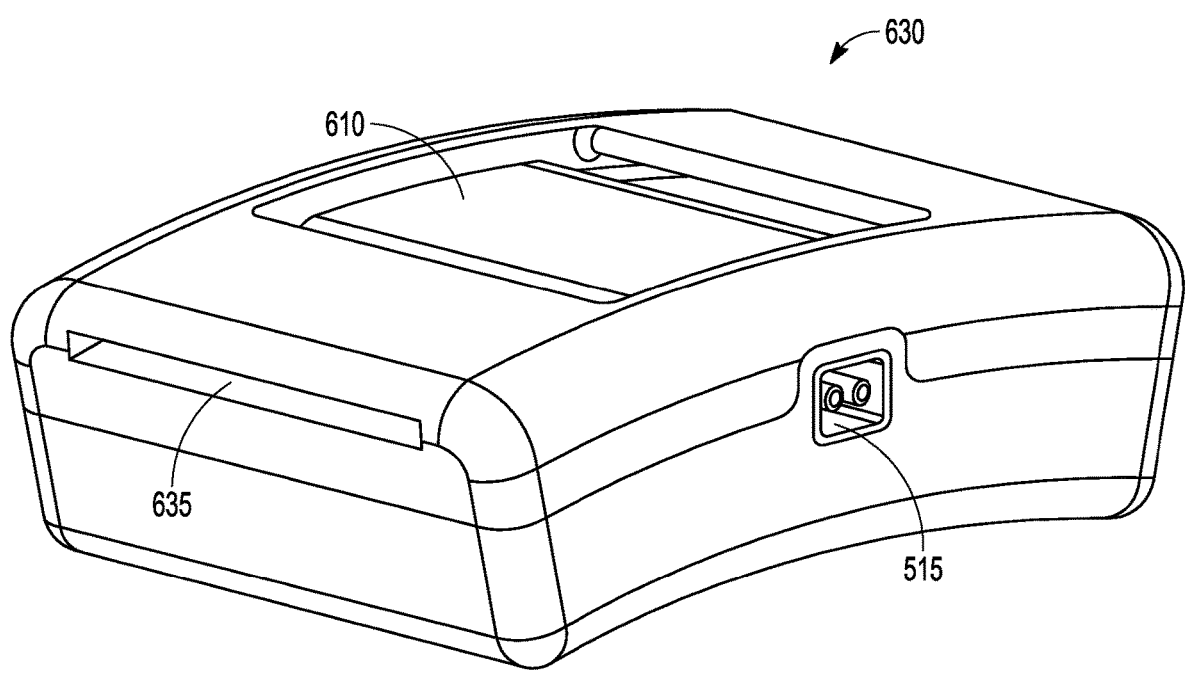
FIG. 6B is a perspective view of an example housing according to an example embodiment.

FIG. 6 is a perspective view of the smart wristband 500 with reference numbers the same as those used in FIG. 5. A display 610 may be supported by the band 510 in a position on the top of the band 510 in a position of the band normally positioned on the top of the wrist of the wearer, similar to the face of a watch. A clasp with holes indicated at 620 may be used to secure the wristband 500 to the wrist. The top of the band may also be fairly rigid and slightly convexly curved with respect to the wrist.

Figure 7:
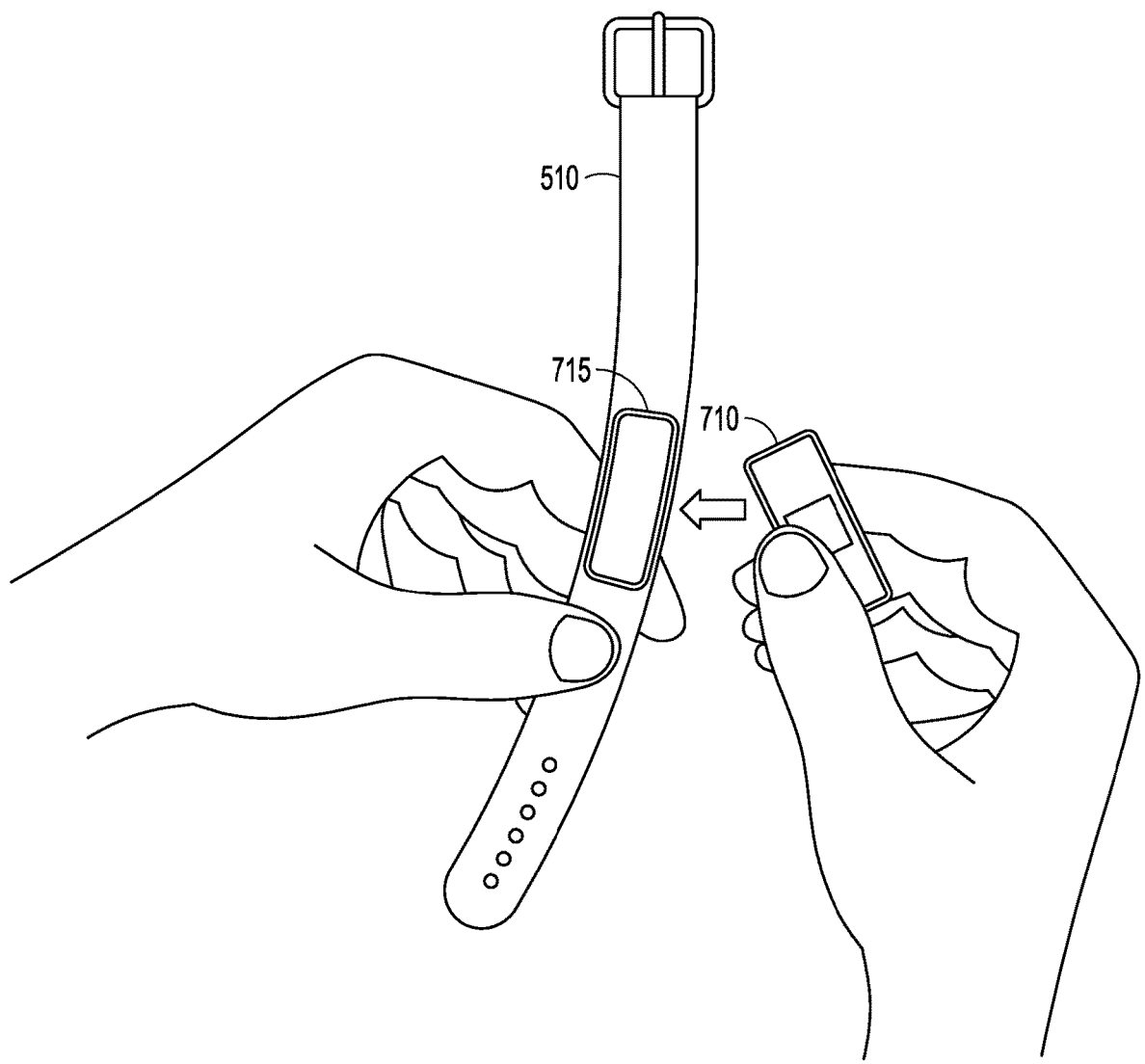
FIG. 7 is a back view of the smart wristband of FIG. 5 illustrating installation of an electronics module into the wristband according to an example embodiment.

FIG. 7 is a back view of the smart wristband 500 illustrating installation of an electronics module 710 into a slot or opening 715 on a back side of the band 510. The electronics module 710 may include a heartrate monitor, printed circuit board (PCB), vibration motor, communication antenna, and other components as desired.

Figure 8:
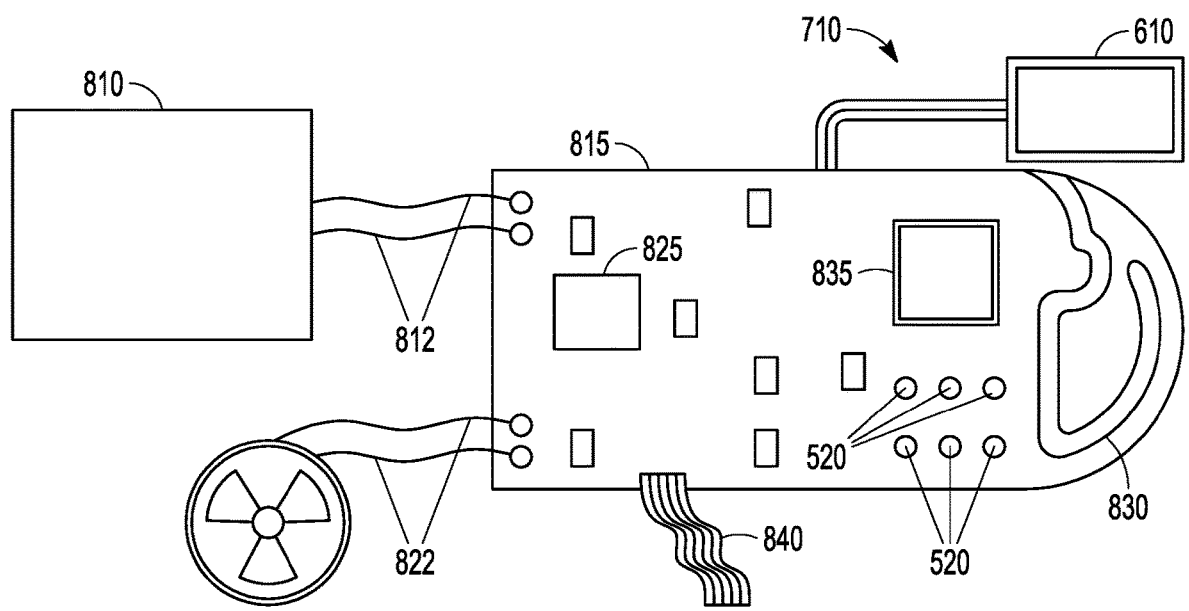
FIG. 8 is a schematic block diagram of the electronics module according to an example embodiment.

FIG. 8 is a schematic block diagram of the electronics module 710. A battery 810 is electrically coupled via conductors 812 to circuitry on a board 815. The battery may be a 3.7-volt rechargeable lithium-polymer battery in one embodiment. A vibration motor 820 is also coupled to the board circuitry via conductors 822. The vibration motor 820 may be any type of vibration motor suitable for providing a physical gentle reminder such as a Jinlong vibration motor. LED lights 520 are supported on the board and are controlled via a programmed processor 825 that is coupled to board circuitry which is not shown for convenience of illustration. Processor 825 may include memory having instructions for causing the processor to receive signals and trigger the vibration motor 820 in response to the signals. The processor may also have a MAC address used for such triggering.

Signals are received via an antenna 830, which may include circuitry for transforming the signals to digital levels for processing by processor 825. Display 610 is also shown separated from a back support 835 for the display, such as an OLED assembly. The display is driven by processor 825. Leads 840 are coupled to the board for attaching to a heart rate sensor or monitor. The processor 825 may be programmed to store and cause display of the heart rate data and transfer the data wirelessly or via a USB connection to a server or other device for uploading to the server.

In some embodiments, existing smart watches have similar functionality built in, and may be programmed with an app or other software to record physiological data as well as to receive signals to trigger pre-alerts in response to texts from a selected origin, email from a select origin, or communications tagged with data designed to trigger such pre-alerts.

In some embodiments, an app is capable of synchronizing existing smart bands with pre-alert functionality to allow responders to use existing smart bands to benefit from the alerting technology.

Figure 9:
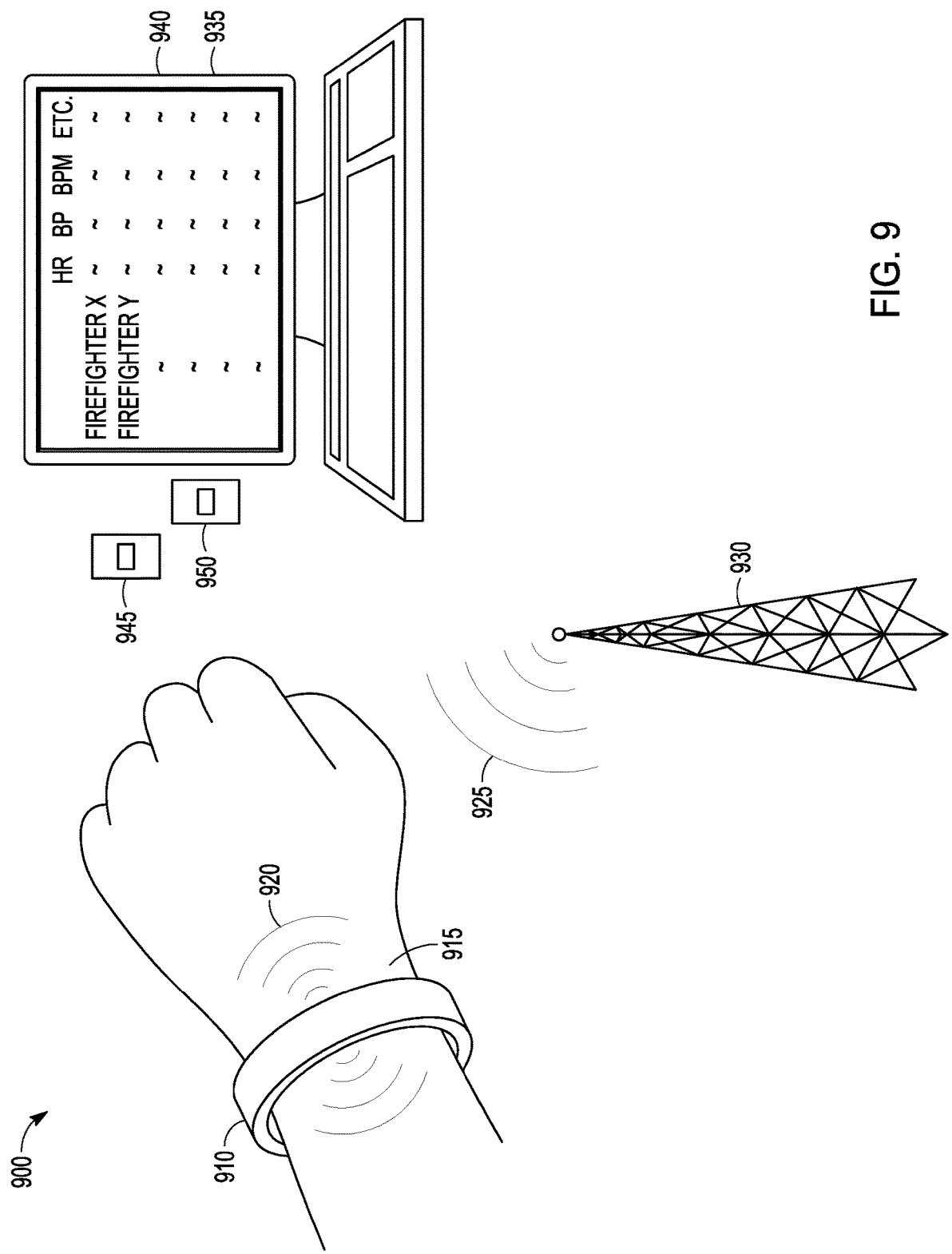
FIG. 9 is a block diagram illustrating a system for providing pre-alerts to wearers of a wristband type communication device according to an example embodiment.

FIG. 9 is a block diagram illustrating a system 900 for providing pre-alerts to wearers of a wristband type communication device 910. The device 910 is shown as designed to be worn on the wrist 915 of a person, with vibration indications 920 showing a pre-alert in progress as initiated from a signal 925 from a dispatcher 930. A separate computer, such as a server 835 may store data collected from the device 910, such as heart rate information and other physiological data that may be collected, such as temperature, EKG data, and other data that devices, such as smart watches are currently capable of collecting. A computer display 940 shows a display of a database containing such collected data. 945 and 950 are representative of mobile devices, such as cellular telephones of various manufacturers. Such mobile devices may also serve as a pre-alert device via a secure app for responder personnel either via their personal phones or responder owned phones.

In one embodiment, the device 910 collects real-time data through Bluetooth Low Energy (BLE) or a similar method, keeping track of, and monitoring, each individual firefighter's stress levels through heart rate, heart rate variability, blood pressure, respiration intervals, and other metrics. The data collected may then serve as preventative measures to recognizing whether a responder is healthy enough to carry out duties effectively and safely. Preventative measures may be taken if a responder is at risk to suffering cardiovascular disease or other stress-induced medical issues.

Radio, cellular. IP. Wi-Fi, or other communication capabilities may be used to communicate the pre-alert from CAD to individual firefighters at relevant stations via their smart bands. Other communication services include cellular networks, a 5G First Responder Network, and dual sim cards.

The firefighters may be able to utilize either the smart band or a similar smart band (e.g. Fitbit, Apple Watch, Garmin, etc.).

An example emergency call scenario is now provided with emergency being a burning house and responders being firefighters:

Civilian notices house burning, calls 9-1-1
9-1-1 operator determines personnel needed to put out fire based on location, size of building, etc.
Initial signal is sent to fire station based upon the least amount of necessary information (location and nature of emergency)
Smart wristband receives a signal and vibrates, notifying necessary firefighters that there is an emergency
Firefighters begin to prepare for dispatch
9-1-1 operator asks follow-up questions
9-1-1 operator sends dispatch to necessary fire stations once all necessary information is known
Alarm at fire department comes on, calling all firefighters to action In some embodiments, those who did not receive a vibration notification on their wristband know that they do not need to respond to the call. In other embodiments, different pre-alerts may be used to indicate whether a particular person is needed for responding to the alarm to come. For instance, a single length of vibration may be used to notify that an alarm is coming, while a series of three separate vibrations may be used to indicate that the person wearing the alert device is responsible for performing actions related to the alarm to come. Such difference in signaling can help people prepare better to selectively react or not react to the coming alarm. Users may select the types of alerts in further embodiments.

Those responding to the emergency experience less of a spike in stress levels since they were prepared for the alarm via vibration prior to alarm sound. Those who are not responding to the emergency do not worry about the alarm since they did not receive the vibration, or they only received one single vibration instead of three separate vibrations as stated in the other aforementioned embodiment. Emergency responders are more focused on the emergency, less physically stressed, and have the ability to provide more efficient and effective assistance than before.

Personnel health information storage in cloud database may be utilized for stress and overexertion prevention, better health knowledge of personnel, ability to mitigate cardiovascular disease.

The electronics module may also include a watch face, sensors to provide global Positioning System (GPS) tracking, nutritional intake monitoring, touch-screen interface, map with directions to scene of emergency, details of emergency displayed on screen, unique notifications for individual personnel, and connection to Bluetooth headset that allows for seamless communication, clock into work via Near-Field Communication (NFC) smart band.

In a further embodiment, real-time automated speech transcription capabilities and a machine-learning algorithm are used by a system to monitor and analyze a 9-1-1 call. The machine-learning algorithm may include natural language processing capabilities to quickly identify the appropriate responder, such as a fire station that will likely be dispatched. Keywords are tracked and vocal biomarkers may be monitored to determine the nature of the emergency. The system will pair this information with location data provided by the caller and knowledge of available apparatuses to determine which fire station to dispatch. Examples of emergency call transcripts may be provided with additional labels indicative of responder identification and may be used to train a model to predict the responder and initiate a pre-alert based on a threshold confidence level.

When the system determines, with a reasonable amount of certainty or confidence, that a specific station will be dispatched, the system sends a signal to the wristbands or notifies a human at the dispatch center that he/she should initiate a pre-alert for a particular station. In one embodiment, the system may be an enhancement to existing Computer Aided Dispatch (CAD) software. The system notifies the firefighter wearing the band that an alarm and a dispatch to an emergency are soon to follow. The tactile notification will gently prepare the firefighter for the alarm to sound without delaying the alarm. This proactive pre-alert mitigates the risk of cardiac arrest and reduces overall response times for firefighters. The system may actually expedite the overall dispatch process. The system assists the human operator by providing a quicker diagnosis than a human can, sending the tactile pre-alert to the wristbands without delaying the dispatch process to generate the actual alarm.

In some embodiments, data sent to the server may be initiated by an operator pressing an exact same button in existing CAD systems to initiate dispatch. In further embodiments, a separate button may be used to initiate the pre-alert. In one embodiment, software separate from the CAD system monitors operator input and notifies the server in response to a particular input being observed. Such input should occur before the official fire station dispatch, but not too soon as to register a large number of "false alarms." False alarms are false positives that occur when a pre-alert is delivered to a firefighter and the alarm does not ever come.

In one embodiment, a machine learning system may be used for accelerating emergency call processing. In one embodiment, the system transcribes the call (ASR) the call and picks up on key terms and phrases (NLP/NLU). Natural language processing (NLP) is one area of artificial intelligence using computational linguistics that provides parsing and semantic interpretation of text, which allows systems to learn, analyze, and understand human language. IBM Watson NLP services may be used in one embodiment by providing the transcript in real time to such services.

The key phrases are traced back to its database of 9-1-1 calls and paired with current information (whereabouts of various apparatuses, current national emergencies, etc.) to present conclusions, suggestions, or information to the dispatcher. As the system picks up on these keys, the system may pop up notifications on the Operator's monitor. The pop-ups help the Operator determine the nature of the emergency more quickly. By offering its assistance, the system can shave minutes off of response times, improve accuracy of dispatch, and protect firefighters better by sharing more information about the emergency. For example, if there is a dangerous scene (e.g. highly contagious patient or armed person on scene), the system will help the Operator pick up on this and notify the firefighters who are responding.

The following is an example of a record of a call complete with elapsed time, time stamps, speaker attribution, and transcript. Multiple such examples may be used to train a system to assist with proper dispatch. The example transcript in TABLE 1 is what may occur without the benefit of such a model. Note that a unit properly equipped to handle the emergency was not dispatched until 2 minutes and 42 seconds into the call after a false start dispatch of an ill-equipped unit.

Transcript

TABLE 1

| Time Elapsed | Date | Time | User | Transcript |
|---|---|---|---|---|
| 0:00:00 | Jun. 21, 2019 | 18:50:25 | Operator | 9-1-1 what's your emergency? |
|  | Jun. 21, 2019 |  | Caller | It's my dad, I'm really worried about him. He just came back from a trip and he's been acting weird since he returned. |
|  | Jun. 21, 2019 |  | Operator | Ok, can you give me your name, phone number, address? |
| 0:00:05 | Jun. 21, 2019 | 18:50:30 | Caller | Jane Doe, (123) 456-7890, 123 Easy St. |
|  | Jun. 21, 2019 |  | Operator | How old is your father and what are his symptoms? |
| 0:00:15 | Jun. 21, 2019 | 18:50:40 | Caller | He's 52 and he's been vomiting and complaining of a headache, which he never does. He's also got pale skin. |
|  | Jun. 21, 2019 |  | Operator | Does he need medical assistance? |
|  | Jun. 21, 2019 |  | Caller | I've been trying to get him to go see his doctor, but he won't go. He says it's not worth it because he doesn't want to get others sick. |
|  | Jun. 21, 2019 |  | Operator | But you feel that he needs medical attention? |
| 0:00:25 | Jun. 21, 2019 | 18:50:50 | Caller | Yes, this is the only way I can get him to be treated. He knows he's not okay, but he just doesn't want to go into the hospital. |
|  | Jun. 21, 2019 |  | Operator | How long has he felt this way? |
| 0:00:30 | Jun. 21, 2019 | 18:50:55 | Caller | He has only shown these symptoms since earlier this morning . . . Maybe around 10:00 am, after he ate breakfast. |
|  | Jun. 21, 2019 |  | Operator | Would you like me to send an ambulance to come check on him? |
| 0:00:35 | Jun. 21, 2019 | 18:51:00 | Caller | I'm not sure . . . He wouldn't want me to do this, but I think it's for the best. |
| 0:00:40 | Jun. 21, 2019 | 18:51:05 | Operator | Ok, I will go ahead and dispatch our nearby rescue and engine units. They will be able to check on your dad and transport him to the hospital if needed. |
|  | Jun. 21, 2019 |  | Caller | Thank you. That would be best . . . His coughing fits are getting worse by the hour . . . Do you know when they'll arrive? |
|  | Jun. 21, 2019 |  | Operator | They should be to your address in about 5 minutes. In the meantime, stay on the line and I'll keep you updated with their whereabouts |
|  | Jun. 21, 2019 |  | Caller | That's great. I'll go tell my dad they are on the way . . . |
| 0:02:05 | Jun. 21, 2019 | 18:52:30 | Caller | He told me to let you know that he has had difficulty breathing. |
|  | Jun. 21, 2019 |  | Operator | Ok, I have made a note of that. Our emergency responders should be there soon. |
|  | Jun. 21, 2019 |  | Caller | He keeps talking about my Aunt Susan like she is coming for dinner, but she passed away years ago . . . |
|  | Jun. 21, 2019 |  | Operator | Has he been making odd statements other than that? |
|  | Jun. 21, 2019 |  | Caller | Yeah, I guess he has been kind of off ever since he came back from Italy . . . |
|  | Jun. 21, 2019 |  | Operator | Is it possible that he could have been exposed to COVID-19 while he was there? |
|  | Jun. 21, 2019 |  | Caller | Oh, I didn't even think about that . . . Yes, I guess it is possible! |

TABLE 1-continued

| Time Elapsed | Date | Time | User | Transcript |
|---|---|---|---|---|
| 0:02:42 | Jun. 21, 2019 | 18:53:07 | Operator | He was traveling with a large group of people. I'm going to dispatch a separate unit that has proper equipment to handle possible contagious virus cases. |
| | Jun. 21, 2019 | | Caller | Ok, thank you. |
| 0:08:35 | Jun. 21, 2019 | 18:59:00 | | Proper emergency response arrives on-scene at 18:59:00 |

The following TABLE 2 represents information seen by an operator at a CAD Monitor in the dispatching operation corresponding to the above transcript in TABLE 1.

TABLE 2

| Time Elapsed | Date | Time | User | Action | Description |
|---|---|---|---|---|---|
| 0:00:00 | Jun. 21, 2019 | 18:50:25 | Operator | Call created | New call created. Call type: >New Call<, Location: >123 Easy St< |
| 0:00:05 | Jun. 21, 2019 | 18:50:30 | Operator | Contact Added | Caller's name: >Jane Doe<, Phone Number: >(123) 456-7890<, Relation to patient: >Daughter< |
| 0:00:15 | Jun. 21, 2019 | 18:50:40 | Operator | Narrative | Patient: >52 YO Male<, Condition: >Pale skin, vomiting, headache< |
| 0:00:15 | Jun. 21, 2019 | 18:50:40 | Operator | Call updated | Medical call type added. Call type: >Medical - Sick patient< |
| 0:00:20 | Jun. 21, 2019 | 18:50:45 | Dispatcher | Unit Recommendation | Available units recommended [Medical - Sick Patient]: E1, R1 |
| 0:00:23 | Jun. 21, 2019 | 18:50:48 | Dispatcher | Call ready | Call marked ready for dispatch |
| 0:00:25 | Jun. 21, 2019 | 18:50:50 | Operator | Narrative | Patient: >Reluctant to receive medical assistance and/or hospital transport< |
| 0:00:27 | Jun. 21, 2019 | 18:50:52 | Dispatcher | Unit Recommendation | Unit recommendation accepted for E1, R1 |
| 0:00:30 | Jun. 21, 2019 | 18:50:55 | Operator | Narrative | Patient: >Has had symptoms for less than 9 hours< |
| 0:00:32 | Jun. 21, 2019 | 18:50:57 | Dispatcher | Unit located | E1 location cleared |
| 0:00:32 | Jun. 21, 2019 | 18:50:57 | Dispatcher | Unit located | R1 location cleared |
| 0:00:35 | Jun. 21, 2019 | 18:51:00 | Operator | Narrative | Caller: >Unsure if patient needs medical assistance< |
| 0:00:40 | Jun. 21, 2019 | 18:51:05 | Operator | Dispatch requested | Requesting dispatch as a precautionary measure. |

TABLE 2-continued

| Time Elapsed | Date | Time | User | Action | Description |
|---|---|---|---|---|---|
| 0:00:42 | Jun. 21, 2019 | 18:51:07 | Dispatcher | Unit status | E1 dispatched |
| 0:00:42 | Jun. 21, 2019 | 18:51:07 | Dispatcher | Unit status | R1 dispatched |
| 0:00:45 | Jun. 21, 2019 | 18:51:10 | Dispatcher | Dispatch accepted | Dispatch accepted for E1, R1 |
| 0:01:45 | Jun. 21, 2019 | 18:52:10 | Dispatcher | Unit status | E1 en route |
| 0:01:45 | Jun. 21, 2019 | 18:52:10 | Dispatcher | Unit status | R1 en route |
| 0:02:05 | Jun. 21, 2019 | 18:52:30 | Operator | Narrative | Situational update: >Patient has severe cough, difficulty breathing, making nonsense comments< |
| 0:02:30 | Jun. 21, 2019 | 18:52:55 | Operator | Narrative | Patient history: >Recently returned from trip abroad< |
| 0:02:35 | Jun. 21, 2019 | 18:53:00 | Operator | Dispatch requested | Possible contagious virus emergency, requesting assistance from Unit R2 |
| 0:02:40 | Jun. 21, 2019 | 18:53:05 | Dispatcher | Unit located | R2 location cleared |
| 0:02:42 | Jun. 21, 2019 | 18:53:07 | Dispatcher | Unit status | R2 dispatched |
| 0:02:45 | Jun. 21, 2019 | 18:53:10 | Operator | Call updated | Call type: >Medical - Contagious virus<; Instructions: >avoid patient contact until R2 arrives with proper gear< |
| 0:03:35 | Jun. 21, 2019 | 18:54:00 | Dispatcher | Unit status | R2 en route |
| 0:06:45 | Jun. 21, 2019 | 18:57:10 | Dispatcher | Unit status | E1, R1 on-scene |
| 0:08:35 | Jun. 21, 2019 | 18:59:00 | Dispatcher | Unit status | R2 on-scene |
| 0:14:35 | Jun. 21, 2019 | 19:05:00 | Dispatcher | Unit status | Transporting patient to Hospital |

The following TABLE 3 is an example transcript of an improved conversation of a call given the same facts as the transcript in TABLE 1, but with assistance from a trained model. The appropriate unit is dispatched several minutes prior to the dispatch in TABLE 1 without trained model assistance.

TABLE 3

| Time Elapsed | Date | Time | User | Transcript |
|---|---|---|---|---|
| 0:00:00 | Jun. 21, 2019 | 18:50:25 | Operator | 9-1-1 what's your emergency? |
| 0:00:10 | Jun. 21, 2019 | 18:50:35 | Caller | It's my dad, I'm really worried about him. He >just came back from a trip abroad< and he's >been acting weird since he returned<. |
| | Jun. 21, 2019 | | Operator | Ok, can you give me your name, phone number, and address? |
| 0:00:15 | Jun. 21, 2019 | 18:50:40 | Caller | Jane Doe, (123) 456-7890, 123 Easy St. |
| | Jun. 21, 2019 | | Operator | Where did your dad return from? |
| 0:00:20 | Jun. 21, 2019 | 18:50:45 | Caller | He just got back from >Italy< where he was traveling with a group of friends<. |

TABLE 3-continued

| Time Elapsed | Date | Time | User | Transcript |
|---|---|---|---|---|
| | Jun. 21, 2019 | | Operator | Is he exhibiting shortness of breath, vomiting, or difficulty with memory? |
| 0:00:30 | Jun. 21, 2019 | 18:50:55 | Caller | Actually, yes. He's >exhibited all of those symptoms< as well as a headache that he's been complaining a lot about. |
| 0:00:34 | Jun. 21, 2019 | 18:50:59 | Operator | Do you know if any of his friends have exhibited any of those symptoms? |
| 0:00:40 | Jun. 21, 2019 | 18:51:05 | Caller | Let me ask him . . . Yes, he said two friends mentioned that they are also experiencing shortness of breath |
| | Jun. 21, 2019 | | Operator | Ok. Your father is exhibiting symptoms of COVID-19, a highly contagious virus. I will dispatch the proper personnel right away. How old is your father? |
| 0:00:45 | Jun. 21, 2019 | 18:51:10 | Caller | Thank you. >He's 52<. |
| 0:00:47 | Jun. 21, 2019 | 18:51:12 | Operator | I'm just dispatched unit that has proper equipment to handle possible contagious virus cases. |
| | Jun. 21, 2019 | | Caller | Ok, thank you. |
| | Jun. 21, 2019 | | Operator | They will be there shortly. Please be sure to wash your hands and maintain a six-foot distance from your father from here on. |
| | Jun. 21, 2019 | | Operator | It is possible that you have been exposed to COVID-19 and it is important that you do all you can to limit the spread of the virus. |
| 0:01:20 | Jun. 21, 2019 | 18:51:45 | Caller | Ok, I will. Thank you very much for all of your help. That was very informative. |
| 0:06:35 | Jun. 21, 2019 | 18:57:00 | | Emergency response arrives on-scene at 18:57:00 |

The following TABLE 4 represents information seen by an operator at a CAD Monitor in the dispatching operation corresponding to the above transcript in TABLE 4.

CAD Monitor

| Time Elapsed | Date | Time | User | Action | Description |
|---|---|---|---|---|---|
| 0:00:00 | Jun. 21, 2019 | 18:50:25 | Operator | Call created | New call created. Call type: >New Call<, Location: >123 Easy St< |
| 0:00:15 | Jun. 21, 2019 | 18:50:40 | Operator | Contact Added | Caller's name: >Jane Doe< Phone Number: >(123) 456-7890< Relation to patient: >Daughter< |
| 0:00:30 | Jun. 21, 2019 | 18:50:55 | Operator | Call Updated | Medical call type added. Call type: >Medical - COVID-19< |

-continued

| Time Elapsed | Date | Time | User | Action | Description |
|---|---|---|---|---|---|
| 0:00:34 | Jun. 21, 2019 | 18:50:59 | Operator | Narrative | Patient Condition: > S.O.B., vomiting, memory loss, headache< |
| 0:00:35 | Jun. 21, 2019 | 18:51:00 | Dispatcher | Unit Recommendation | Available units recommended [Medical - COVID-19]: R2 |
| 0:00:40 | Jun. 21, 2019 | 18:51:05 | Dispatcher | Call ready | Call marked ready for dispatch |
| 0:00:42 | Jun. 21, 2019 | 18:51:07 | Dispatcher | Unit Recommendation | Unit recommendation accepted for R2 |
| 0:00:44 | Jun. 21, 2019 | 18:51:09 | Dispatcher | Unit located | R2 location cleared |
| 0:00:40 | Jun. 21, 2019 | 18:51:05 | Operator | Narrative | Patient: >Possibly exposed to individuals with COVID-19 in Italy< |
| 0:00:47 | Jun. 21, 2019 | 18:51:12 | Operator | Dispatch requested | Requesting dispatch for R2. |
| 0:00:47 | Jun. 21, 2019 | 18:51:12 | Dispatcher | Unit status | R2 dispatched |
| 0:00:49 | Jun. 21, 2019 | 18:51:14 | Dispatcher | Dispatch accepted | Dispatch accepted for R2 |
| 0:00:45 | Jun. 21, 2019 | 18:51:10 | Operator | Narrative | Patient: >52 YO Male< |
| 0:01:49 | Jun. 21, 2019 | 18:52:14 | Dispatcher | Unit status | R2 en route |
| 0:06:35 | Jun. 21, 2019 | 18:57:00 | Dispatcher | Unit status | R2 on-scene |
| 0:12:35 | Jun. 21, 2019 | 19:03:00 | Dispatcher | Unit status | Transporting patient to Hospital |

With the use of the trained model, the appropriate unit is dispatched about two minutes faster than the example without the use of the trained model. The trained model keyed on statements made by the caller to provide questions to the operator related to the keywords identified as shown below in TABLE 5. Cost savings is also realized in that fewer units were dispatched that could have been serving other emergencies. An additional benefit in this particular call is that there is less risk of responder personnel being exposed to a harmful virus.

Live Assitance (To Appear on Operator's Monitor)

TABLE 5

| Time | Key Words/Phrases | Action | Description |
|---|---|---|---|
| 18:50:35 | just came back from a trip abroad | Suggestion | Ask where patient returned from. (Foreign illness possibility) |
| 18:50:35 | been acting weird since he returned | Conclusion | Abnormal symptom(s) |
| 18:50:45 | Italy | Suggestion | Italy has a HIGH concentration of COVID-19 cases |
| 18:50:45 | " | Information | COVID-19 is a highly contagious virus with high mortality rates |
| 18:50:45 | " | Suggestion | Ask if the patient is exhibiting S.O.B., vomiting, or memory issues. |
| 18:50:45 | traveling with a group of friends | Suggestion | Ask if any of his friends have had similar symptoms. |
| 18:50:55 | exhibited all of those symptoms | Conclusion | Patient likely has COVID-19 |
| 18:51:10 | He's 52 | Conclusion | Patient is in high-risk category for COVID-19 |
| 18:51:10 | " | Suggestion | Hospital transport is suggested |

TABLE 5-continued

| Time | Key Words/Phrases | Action | Description |
| --- | --- | --- | --- |
| 18:51:45 | *Closing of call* | Suggestion | Recommend caller washes hands and maintains 6-feet of distance |

Wireless tapping into existing communication between dispatch centers and fire departments may also be utilized to provide information from which dispatch may be predicted. For example, Nassau County Sheriff's Office (NCSO) dispatches Fernandina Beach Fire Department (FBFD) and Nassau County Fire Rescue (NCFR). NCSO currently triggers alarm at stations within FBFD and NCFR via IP communication. NSCO monitors all radio activity in FBFD and NCFR as well. The system can tap into either of these lines of communication, or others, to send a pre-alert notification to firefighters at a given station within the aforementioned departments.

For training a machine learning model to determine the responder most likely to be dispatched, multiple call logs may be examined and labeled with responder IDs. The operator may be provided with the responder ID and enabled to click on button resulting in creation and sending of a pre-alert communication. The button may be in a separate window generated by the system or may be integrated into the CAD system.

Figure 10:
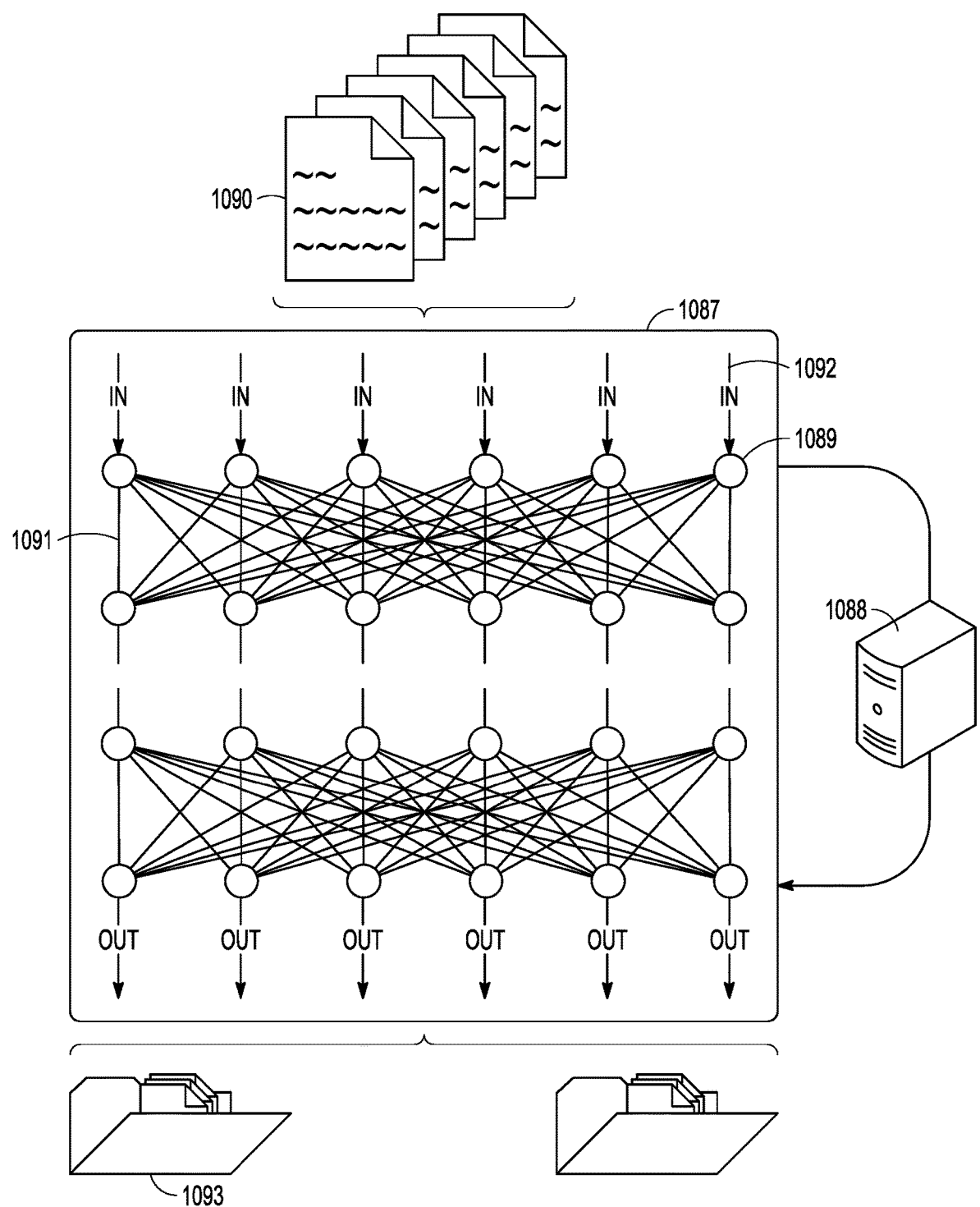
FIG. 10 is a block diagram of an example of an environment including a system for neural network training according to an example embodiment.

In one embodiment, an (AI) module that receives position information about the call in progress may be used to either predict the responder likely to be called, enhance call processing and dispatch, or both. FIG. 10 provides some background information regarding neural networks to aid in understanding operation of various embodiments.

Artificial intelligence (AI) is a field concerned with developing decision-making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), and automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well-known optimization algorithm for back propagation may be used, such as SGD, Adam, etc.

FIG. 10 is a block diagram of an example of an environment including a system for neural network training, according to an embodiment. The system includes an ANN 1087 that is trained using a processing node 1088. ANN 1087 may be implemented as a module and used in conjunction with the combined reward functions. Example modules include convolutional neural networks (CNN) and other types of networks such as ResNet, a type of network that uses residual functions, as well as any other type of network that may be adapted to utilize reward functions. Such neural networks may consist of one or more layers of neurons or synapses in various embodiments. The number of layers may depend on the type of network selected. ResNet may have 50 layers, for example, while other networks may have from a few to a thousand or more. Other CNN structures that may be used include but are not limited to VGG, Inception, and Exception.

The processing node 1088 may be a CPU, GPU, field programmable gate array (FPGA), digital signal processor (DSP), application specific integrated circuit (ASIC), or other processing circuitry. In an example, multiple processing nodes may be employed to train different layers of the ANN 1087, or even different nodes 1089 within layers. Thus, a set of processing nodes 1088 is arranged to perform the training of the ANN 1087.

The set of processing nodes 1088 is arranged to receive a training set 1090 for the ANN 1087. The ANN 1087 comprises a set of nodes 1089 arranged in layers (illustrated as rows of nodes 1089) and a set of inter-node weights 1091 (e.g., parameters) between nodes in the set of nodes. In an example, the training set 1090 is a subset of a complete training set. Here, the subset may enable processing nodes with limited storage resources to participate in training the ANN 1087.

The training data may include multiple numerical values representative of a domain, such as red, green, and blue pixel values and intensity values for an image or pitch and volume values at discrete times for speech recognition. Each value of the training or input 1092 to be classified once ANN 1087 is trained, is provided to a corresponding node 1089 in the first layer or input layer of ANN 1087. The values propagate through the layers and are changed by the objective function.

As noted above, the set of processing nodes is arranged to train the neural network to create a trained neural network. Once trained, data input into the ANN will produce valid classifications 1093 (e.g., the input data 1092 will be assigned into categories), for example. The training performed by the set of processing nodes 1089 is iterative. In an example, each iteration of the training the neural network is performed independently between layers of the ANN 1087. Thus, two distinct layers may be processed in parallel by different members of the set of processing nodes. In an example, different layers of the ANN 1087 are trained on different hardware.

ANN 1087 may calculate one or more neuron or synapse weights 1091 for criteria based upon one or more machine learning algorithms. During training, historical action information representing past actions of the robot may be labeled with an indication of whether the decision made was ultimately successful, in this case, the reward. Thus, the reward, which is based on both robot navigation and the ability to track the object, is used to update the network weights 1091. Note that in various networks, initial weights may be pre-set. In other networks, initial weights may be randomized. In one embodiment, a module or processor executing computer instructions to effectuate the neural network learning operations modifies a source neuron's output with a synapse weight to determine the contribution of the source neuron to cause the sink neuron to fire. Practically, in this embodiment, a single and modified value is integrated at the sink neuron in response to the source neuron activation.

Figure 11:
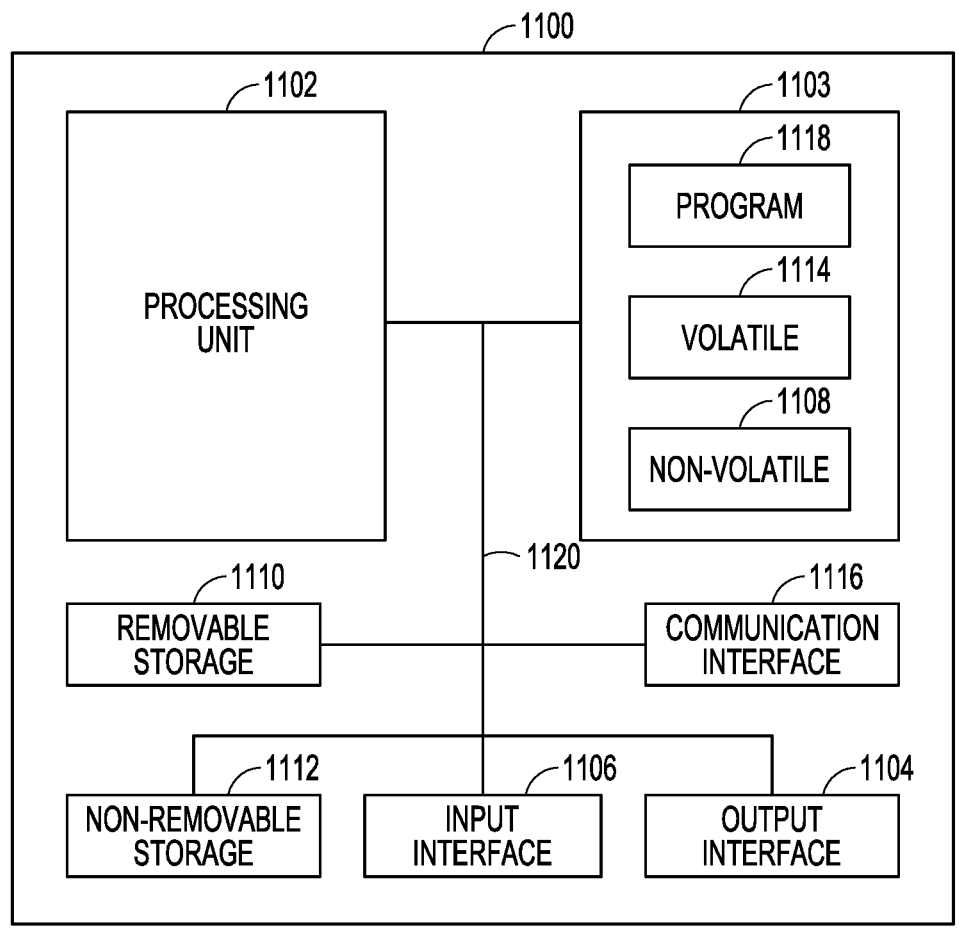
FIG. 11 is a block schematic diagram of a computer system to generate pre-alerts and for performing methods and algorithms according to an example embodiment.

FIG. 11 is a block schematic diagram of a computer system 1100 to generate pre-alerts and for performing methods and algorithms according to example embodiments. All components need not be used in various embodiments.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, smart storage device (SSD), or other computing device including the same or similar elements as illustrated and described with regard to FIG. 11. Devices, such as smartphones, tablets, and smartwatches, are generally collectively referred to as mobile devices or user equipment.

Although the various data storage elements are illustrated as part of the computer 1100, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software to implement one or more of the methods of providing pre-alerts to responders. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1118 along with the workspace manager 1122 may be used to cause processing unit 1102 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving data identifying a responder in response to a call to an emergency operator;
identifying a relay device associated with the identified responder; and
sending a communication to the relay device to cause the relay device to issue a pre-alert to a communication device of at least one person associated with the responder, wherein the pre-alert is initiated prior to an alarm sounding at the responder.

2. The method of claim 1 wherein the pre-alert comprises a vibration of the communication device.

3. The method of claim 1 wherein the wherein the communication device vibrates with increasing intensity in response to the wireless signal from the relay device.

4. The method of claim 1 wherein identifying a relay device comprises using the identified responder to determine a logical address of the relay device.

5. The method of claim 4 wherein the logical address of the relay device comprises communication addresses.

6. The method of claim 5 wherein the communication is sent to the relay device based on the communication addresses.

7. The method of claim 1 wherein communication comprises a wireless signal and the communication device is configured to be worn by the at least one person associated with the responder.

8. The method of claim 7 wherein the communication device vibrates in response to the wireless signal from the relay device.

9. The method of claim 8 wherein the communication device comprises a device adapted to be worn on a wrist of at least one person.

10. The method of claim 7 wherein the communication device vibrates in a gradually increasing intensity in response to the wireless signal from the relay device.

11. The method of claim 7 wherein the relay device sends a wireless signal to each of the communication devices worn by respective persons associated with the responder.

12. The method of claim 1 wherein the communication is sent to the relay device in response to an operator action and prior to an alarm being sounded at the responder.

13. The method of claim 1 wherein the communication is sent to the relay device in response to the responder being identified and prior to an alarm being sounded at the responder.

14. A method comprising:
receiving data identifying a responder in response to a call to an emergency operator;
identifying one or more persons associated with the responder;
determining communication addresses of communication devices associated with respective persons of the one or more persons; and
sending a communication to each of the communication devices using the communication addresses to issue a pre-alert to the one or more persons, wherein the communication is sent prior to an alarm sounding at the responder.

15. The method of claim 14 wherein the data identifying a responder comprises a location and wherein the location is within an area for which the responder is responsible, wherein the location is determined by the operator to be associated with an emergency which requires assistance from a responder.

16. The method of claim 15 wherein the communication address of each communication device comprises an IP address, a MAC address, a phone number, or email address and wherein the communication device is a wireless device.

17. The method of claim 15 wherein the communication device vibrates in response to the communication.

18. The method of claim 14 wherein the data identifying a responder is received in response to an operator action.

19. A machine-readable storage device having instructions for execution by a processor of a machine to cause the processor to perform operations to perform a method, the operations comprising:
receiving data identifying a responder in response to a call to an emergency operator;
identifying one or more persons associated with the responder;
determining communication addresses of communication devices associated with respective persons of the one or more persons; and
sending a communication to each of the communication devices using the communication addresses to issue a pre-alert to the one or more persons, wherein the communication is sent prior to an alarm sounding at the responder.

20. The device of claim 19 wherein the data identifying a responder comprises a physical address of a structure, wherein the structure is within an area for which the responder is responsible, wherein the communication address of each communication device comprises an IP address, a MAC address, a phone number, or email address, wherein the communication device is a wireless device, and wherein the communication device vibrates in response to the communication.

* * * * *